(12) United States Patent
Reith et al.

(10) Patent No.: US 12,091,083 B2
(45) Date of Patent: Sep. 17, 2024

(54) METHOD AND SYSTEM FOR PROVIDING TRANSFORMATION PARAMETERS

(71) Applicant: ZF Friedrichshafen AG, Friedrichshafen (DE)

(72) Inventors: Ulrich Reith, Ravensburg (DE); Tomas Szabo, Ravensburg (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 290 days.

(21) Appl. No.: 17/295,953

(22) PCT Filed: Nov. 12, 2019

(86) PCT No.: PCT/EP2019/080956
§ 371 (c)(1),
(2) Date: May 21, 2021

(87) PCT Pub. No.: WO2020/104244
PCT Pub. Date: May 28, 2020

(65) Prior Publication Data
US 2022/0009551 A1    Jan. 13, 2022

(30) Foreign Application Priority Data
Nov. 23, 2018    (DE) ..................... 10 2018 220 159.5

(51) Int. Cl.
*B62D 15/02*    (2006.01)
*G01C 21/00*    (2006.01)
(Continued)

(52) U.S. Cl.
CPC ............ *B62D 15/025* (2013.01); *G01S 19/46* (2013.01)

(58) Field of Classification Search
None
See application file for complete search history.

(56) References Cited

U.S. PATENT DOCUMENTS

| | | | |
|---|---|---|---|
| 2006/0095234 A1 | 5/2006 | Brignone et al. | |
| 2010/0191461 A1* | 7/2010 | Zeng | G01S 13/931 |
| | | | 701/532 |

(Continued)

FOREIGN PATENT DOCUMENTS

| | | |
|---|---|---|
| CN | 101082501 A | 12/2007 |
| CN | 102721409 A | 10/2012 |

(Continued)

OTHER PUBLICATIONS

International Search Report and Written Opinion of the International Search Authority mailed Feb. 14, 2020 in International Application No. PCT/EP2019/080956 (English and German languages) (12 pp.).

(Continued)

*Primary Examiner* — Aniss Chad
*Assistant Examiner* — Mahmoud M Kazimi
(74) *Attorney, Agent, or Firm* — Crowell & Moring LLP (57) ABSTRACT

A method may determine transformation parameters for a transformation of a position of a vehicle between a first coordinate system and a second coordinate system. In the method, a trajectory may be traveled with the vehicle in a step. In another step, the positions of the vehicle while traveling the trajectory may be acquired in the first coordinate system with a first position detection system, and in the second coordinate system with a second position detection system. In a further step, transformation parameters between the coordinate systems may be derived based on the positions of the vehicle acquired in the coordinate systems, and based on at least one geometric parameter of the trajectory.

17 Claims, 5 Drawing Sheets

(51) Int. Cl.
    *G01C 21/28*     (2006.01)
    *G01S 19/46*     (2010.01)
    *G01S 19/48*     (2010.01)

(56) References Cited

U.S. PATENT DOCUMENTS

| | | |
|---|---|---|
| 2010/0305854 A1 | 12/2010 | Kammel et al. |
| 2017/0169300 A1* | 6/2017 | Heisele .................... G06T 7/74 |
| 2017/0247029 A1* | 8/2017 | Watanabe ............. B60W 10/20 |

FOREIGN PATENT DOCUMENTS

| | | | |
|---|---|---|---|
| CN | 106157693 | A | 11/2016 |
| CN | 106226796 | A | 12/2016 |
| CN | 106991414 | A | 7/2017 |
| CN | 108036794 | A | 5/2018 |
| CN | 108346165 | A | 7/2018 |
| CN | 108450034 | A | 8/2018 |
| DE | 10 2013 015705 | A1 | 3/2015 |

OTHER PUBLICATIONS

Office Action dated Jul. 23, 2019 for German Patent Application No. 10 2018 220 159.5, (8 pp.), note: pp. 1 and 2 are English language Explanations to Section C. Result of Determination Document.
Office Action with Search Report in Corresponding Chinese Application No. CN No. 201980076869.5, dated Oct. 19, 2023, with English translation (22 pages).
Second Office Action in Corresponding Chinese Application No. 201980076869.5, dated Feb. 29, 2024, with English translation (11 pages).

\* cited by examiner

METHOD AND SYSTEM FOR PROVIDING TRANSFORMATION PARAMETERS

RELATED APPLICATIONS

This application is a filing under 35 U.S.C. § 371 of International Patent Application PCT/EP2019/080956, filed Nov. 12, 2019, and claiming priority to German Patent Application 10 2018 220 159.5, filed Nov. 23, 2018. All applications listed in this paragraph are hereby incorporated by reference in their entireties.

TECHNICAL FIELD

The present disclosure relates to a method and a system for providing transformation parameters for transforming a vehicle position between coordinate systems. The present disclosure also relates to a control unit for executing such a method. The present disclosure also relates to a vehicle that has such a control unit or such a system.

BACKGROUND

The determination of the location of a transport vehicle using an antenna attached to the transport vehicle and a transponder at a fixed location in a road is known from DE 10 2016 108 446 A1. A location of a vehicle can be determined within the spatial area of a transponder network using a transponder network embedded in a road surface.

BRIEF DESCRIPTION OF THE DRAWINGS

Certain features, aspects, and advantages of the disclosed embodiments are shown in the drawings accompanying this description. The drawings are briefly described below.

DETAILED DESCRIPTION

The present disclosure relates to a method for providing transformation parameters for transforming a position of a vehicle between a first coordinate system and a second coordinate system. A transformation of the position of the vehicle between the first coordinate system and the second coordinate system can contain a transformation of the position of the vehicle from the first coordinate system to the second coordinate system, or vice versa, when the transformation parameter is known. In addition to the second coordinate system, at least one other coordinate system may be taken into account, in which case transformation parameters can be provided in pairs for two of the at least three coordinate systems according to the method.

The position of the vehicle can indicate a position or location of the vehicle in one of the coordinate systems. The position of the vehicle that is to be transformed can fundamentally be any point defined in a vehicle coordinate system that can be established inside the vehicle, on the vehicle, or in the vehicle's environment. The vehicle coordinate system can be a coordinate system linked to the vehicle itself, or moving with the vehicle. The position of the vehicle that is to be transformed can also relate to a specific vehicle reference point, e.g. at the middle of a vehicle axis. The position of the vehicle that is to be transformed can thus relate to a current location of the vehicle or a current vehicle position along a vehicle's traveled or projected trajectory.

The transformation can be a two dimensional similarity transformation with four transformation parameters. The four transformation parameters can comprise a rotation angle, a translation vector, which can contain two translation parameters, and a scaling factor. The scaling factor can be predefined, i.e. substantially equal to one, for example. The transformation can be a two dimensional affine transformation with at least five transformation parameters. These transformation parameters can comprise, in addition to the four transformation parameters of the two dimensional similarity transformation, at least one shear angle between the axes of the coordinate system as a further transformation parameter.

The first coordinate system can be a local coordinate system, e.g. a transponder coordinate system or a transponder grid, and the second coordinate system can be a global coordinate system, e.g. a satellite navigation coordinate system, or vice versa. The global coordinate system can also be referred to as a superordinate coordinate system. The terms, "local," "global," and "superordinate," can be understood hierarchically in terms of their spatial dimensions for a corresponding determination of a vehicle's position. As such, the determination of the position in a local coordinate system may be limited locally, while the determination of the position in a global coordinate system may be substantially unlimited. The terms, "local," "global," and "superordinate," can also be understood functionally, wherein the local coordinate system can fill in a gap in the position determination with the global coordinate system. As such, a transponder system functioning as a local position detection system in a building can compensate for the unavailability of a satellite positioning system functioning as the global position detection system. One of the coordinate systems can therefore also be an indoor coordinate system, and the other can be an outdoor coordinate system.

The vehicle can fundamentally be any vehicle, wherein it can be a rail vehicle or not a rail vehicle, that can be designed to transport containers, materials or freight. The vehicle can therefore be a transport vehicle. Alternatively or additionally, the vehicle can be a work vehicle, e.g. a construction vehicle. The vehicle can move, e.g. within a container harbor, a train station, on factory grounds, in a factory building, and/or on a construction site, wherein the vehicle can also travel from one of these locations to another of these locations.

The method contains a step in which the vehicle travels along a trajectory. The vehicle can travel on a street, a navigable substrate, or any other finished surface. The trajectory can be traveled automatically or by remote control, or manually by a driver. The trajectory can have a predefined geometry. Alternatively, the trajectory can have a substantially arbitrary geometry. Traveling along the trajectory can therefore involve driving or traveling along the trajectory with the vehicle. In other words, the trajectory can contain a pathway that has been predetermined, or actually traveled by the vehicle. The gradients, and therefore the elevation of the vehicle when traveling along the trajectory, can be disregarded.

Geometric information relating to the trajectory can be provided in the method. The geometric information can fundamentally relate to an arbitrary geometry of the trajectory. The geometric information can include the at least one geometric parameter or a geometric element of the trajectory. Providing geometric information or the geometric parameters relating to the trajectory can be carried out as a further step, prior to, during, and/or after the step involving traveling along the trajectory with the vehicle. In other words, geometric information relating to a projected trajectory, or relating to a traveled trajectory, can be provided in the method. The provision of geometric information can therefore involve predefining and/or determining geometric information. The transformation parameter can be derived from this geometric information.

In another step, the position of the vehicle is acquired in the first coordinate system while traveling along a trajectory using a first position detection system. The first position detection system can be, e.g. the transponder system for detecting positions of the vehicle within the transponder coordinate system. The transponder system can comprise an antenna on the vehicle and a transponder network embedded in the road surface, in particular an RFID network for detecting vehicle positions.

The method contains a further step for acquiring a position of the vehicle in the second coordinate system while traveling along the trajectory with a second position detection system. The second position detection system can be the satellite navigation system for detecting positions of the vehicle in the satellite navigation coordinate system. The satellite navigation system can be a system based on GNSS information. The satellite navigation system can include a receiver for satellite signals on the vehicle, e.g. a GNSS antenna.

At least one of the position detection systems can also detect a direction or an orientation of the vehicle along the traveled trajectory in a coordinate system. A direction or orientation can also be derived from at least two detected positions, or it can be acquired directly in relation to a position. A yaw sensor can be placed on the vehicle for this. A position detection system can therefore be a system that indicates a position and a direction.

The method contains a further step in which transformation parameters are derived between the coordinate systems on the basis of the positions of the vehicle acquired in the coordinate system and on the basis of at least one geometric parameter of the trajectory. Transformation parameters between the coordinate systems can therefore be calculated on the basis of the detected positions and/or geometric parameters. The acquired positions can be used for this as ground control points or corresponding points for calculating transformation parameters. Alternatively or additionally, geometric parameters can be used as corresponding geometric objects for calculating the transformation parameters.

The derivation of the transformation parameters can also include correcting or improving transformation parameters that can be derived on the basis of the acquired positions of the vehicle. Such a correction or improvement can be obtained using the at least one geometric parameter of the trajectory. The at least one geometric parameter can therefore also serve as supplementary information for deriving transformation parameters. In addition, a direction or orientation of the vehicle detected in both coordinate systems can be used to derive transformation parameters.

Transformation parameters can be calculated in the framework of the present disclosure to transform a vehicle position between two coordinate systems on the basis of discrete position information and/or geometric properties of a navigable trajectory. By using geometric parameters, e.g. a geometric curve parameter of the trajectory, distortions and scales can also be derived between the coordinate systems, in addition to a translation and a rotation between coordinate systems. Transformation parameters derived on the basis of acquired positions can therefore be corrected locally. In other words, differences between coordinate systems that cannot be resolved on the basis of just the acquired positions can first be determined and corrected by taking a geometric trajectory parameter into account. A superimposing of the coordinate systems can be improved in this way. The yield of the derivable transformation parameters can therefore be improved in the framework of the present disclosure, such that a further transformation element in the form of a geometric parameter of the trajectory can be added to a position-based derivation of transformation parameters.

An advantageous effect can therefore be seen therein in that, when changing between the position detection systems, or when changing between taking different, or numerous different, position detection systems into account while navigating the vehicle, for which the transformation parameters can be used, a transition without jumps or gaps can be obtained between the various coordinate systems while traveling. When unavailable, or during a system change, an ongoing navigation can therefore be carried out without longitudinal or lateral jumps or corrections with regard to the direction of travel while traveling, based on the various systems. Undesired vehicle reactions during such a change, or transition, i.e. supposed changes in the position or direction of the vehicle during the transition between various systems, can therefore be prevented.

A system transition may be necessary, e.g. if the vehicle travels under a building roof from an exposed area, where it may be possible to navigate with a transponder system, but navigation within a satellite navigation system may be impossible because the satellite signals are blocked by the roof. A transition may then be necessary between the satellite navigation system and the transponder system based on the derived transformation parameters between these systems.

In one embodiment of the method, the step for deriving transformation parameters contains a determination or acquisition of at least one geometric parameter on the basis of the positions of the vehicle that are acquired while it travels along the trajectory in the coordinate system. In the framework of this embodiment, the step for deriving transformation parameters also contains a comparison of the at least one predefined or determined geometric parameter with the at least one geometric parameter of the trajectory. A predefined or determined geometric parameter of the trajectory can therefore be compared with an acquired geometric parameter, which can be derived from the positions that can be acquired along the trajectory. Geometric parameters acquired in both coordinate systems can be acquired geometric curves, for example, based on an interpolation of acquired vehicle positions. A comparison can be carried out during travel, or "online," or after traveling along the trajectory, or in a post-processing.

A trajectory geometry, or a geometric parameter, can be obtained in both coordinate systems with the respective position detection systems, and compared with at least one known geometric parameter of the trajectory. A position acquisition with a respective position detection system can then be corrected or calibrated on the basis of such a comparison. By comparing trajectory geometries acquired with both position detection systems, relative differences or gaps between the two position detection systems can be determined and corrected. Absolute differences or systematic position errors can be determined and corrected by comparing trajectory geometries acquired using one of the position detection systems with a predefined trajectory geometry.

Another embodiment of the method contains a further step for defining the trajectory along which the vehicle travels. The predefined trajectory can fundamentally take any form. A geometric course of the trajectory can therefore be defined prior to travel. Navigable waypoints may be defined along the trajectory, the positions of which can be determined in at least one of the coordinate systems. A position of the vehicle in the coordinate system can be acquired with the position detection system along the predefined geometric course and/or at one of these waypoints. The position can be acquired while traveling, or during interruptions. Travel along a predefined trajectory can therefore include branchings along the trajectory.

According to this embodiment, the step for deriving transformation parameters can be carried out on the basis of at least one predefined geometric parameter of the trajectory. A trajectory geometry acquired with the position detection system can therefore be compared with a predefined trajectory geometry. The predefined trajectory geometry can therefore also contain a reference geometry or a target geometry, and an acquired trajectory geometry can contain an actual geometry.

In another embodiment of the method, a projected trajectory is defined on the basis of a route. The route can have a predefined geometry along which the vehicle can travel. Alternatively or additionally, waypoints can be set along the route, between which the vehicle can move. Recesses for the wheels of the vehicle can be provided in a road surface at the waypoints, in order to be able to repeatedly position the vehicle in a predefined position. The geometry of the overall route and/or the positions of the individual waypoints can be defined as a geometric parameter, and used as the basis for deriving the transformation parameter.

According to this embodiment, the step for traveling along the trajectory is carried out by traveling along the route. The vehicle can move on or off rails along the route. The vehicle can move autonomously along the route, or it can be moved along this route. Traveling along the trajectory can therefore comprise a calibration drive for determining differences between the position detection systems when acquiring positions.

According to this embodiment, the step for deriving transformation parameters can be carried out on the basis of at least one geometric parameter of the trajectory defined by the route. A geometry of the route determined on the basis of the acquired positions can be compared with the predefined geometry. Correction parameters, or transformation parameters, can be derived by adapting the determined geometry to the predefined geometry.

In another embodiment of the method, a projected trajectory is defined on the basis of a vehicle control parameter. The vehicle control parameter can be any parameter that results in a specific trajectory geometry by controlling the vehicle with the parameter. There can be a clear functional relationship between the control parameter and the resulting trajectory geometry.

The vehicle control parameter can be a control parameter for controlling the steering system of the vehicle. Such a control parameter can be a steering angle, for example, which results in a curve with a specific curvature or specific radius. The steering angle can therefore indirectly define the curvature as a geometric parameter. The steering angle can be a maximum steering angle, for example, which can be obtained automatically or manually. An unchanging steering angle can be kept constant while traveling along the trajectory. A defined arc with a defined diameter can thus be traveled by the vehicle. At low speeds, the arc can be traveled more precisely.

According to this embodiment, the step for deriving transformation parameters can be carried out on the basis of at least one geometric parameter of the trajectory defined by the vehicle control parameter.

One embodiment of the method contains a further step for determining a trajectory traveled by the vehicle. A geometric course of the trajectory can therefore be determined during travel or afterwards. The passing of waypoints can be determined along the trajectory, the positions of which can be determined in at least one of the coordinate systems. A position of the vehicle can be acquired in the coordinate system along the determined geometric course and/or at such a waypoint with the position detection system. Traveling along a predefined trajectory can therefore include a fundamentally arbitrary route of the vehicle along the determined, actual trajectory geometry.

According to this embodiment, the step for deriving transformation parameters can be carried out on the basis of at least one geometric parameter of the trajectory that has been determined. A trajectory geometry acquired with the position detection system can then be compared with a determined trajectory geometry. The determined trajectory geometry can then be determined with a detection system other than the position detection system. The other detection system can be a position detection system that is independent of the position detection systems. The traveled trajectory geometry acquired with the detection system can therefore include a target geometry and a trajectory geometry of an actual geometry acquired with a position detection system.

Another embodiment of the method contains a visualization of a traveled trajectory as a further step, wherein the at least one geometric parameter of the traveled trajectory is derived from the visualized trajectory. The visualization of the trajectory can be carried out on a road surface. The trajectory can be transferred visibly onto the road surface for this. This transference can take place, for example, using a colored substance applied to the wheels or directly to the road surface. The color or surface contour of the road surface can be altered by a wheel rolling over it to obtain the visualization of the trajectory. The transference of the trajectory to the road surface can also be carried out with a visualization device on the vehicle, which can alter a visualization substance on the road surface, or apply a visualization substance to the road surface. In the simplest embodiment, a paintbrush can be used for this, which can apply paint to the road surface. Alternatively or additionally, the visualization can be carried out on the basis of a light emitting component, e.g. a vehicle light. The path followed by the light emitting component can be traced for this. By way of example, a camera can follow the movement of the light emitting component. The geometry of the visualized trajectory can then be measured and a geometric parameter can be derived therefrom. A measurement of the visualized trajectory can take place on the road surface or with a camera-based evaluation unit.

Another embodiment of the method contains a measurement-technology detection of a traveled trajectory, wherein the at least one geometric parameter of the traveled trajectory is derived from the trajectory acquired using measurement-technology. The movement of the vehicle while traveling along the trajectory can be acquired with a measurement system. The vehicle can be tracked, e.g. with a tracking system, in which a tachymeter can track a prism on the vehicle. The vehicle can also be tracked with another measurement system, e.g. a camera system or a laser scanning-based measurement system, to determine the geometry of the trajectory the vehicle has traveled. In addition to the geometry of the trajectory traveled by the vehicle, individual vehicle positions and orientations along the traveled trajectory can also be acquired using measurement technology.

In another embodiment of the method, a vehicle control parameter is acquired in the step in which the vehicle travels along a trajectory, with which the vehicle is controlled while traveling along the trajectory. The at least one geometric parameter of the traveled trajectory can then be derived from the acquired vehicle control parameter. The described, predefined vehicle control parameter can be determined instead of being predefined, and the trajectory geometry can be derived therefrom. The curvature of the trajectory, and the location thereof can therefore be determined as geometric parameters, e.g. from a recorded series of steering angles. In addition to the series of steering angles, the speeds of the vehicle can also be detected. The trajectory that has been travelled can then be derived from the series of steering angles or both the steering angles and the speeds. Alternatively or additionally, a travelled trajectory can be acquired on the basis of the acceleration sensors or odometer sensors on the vehicle.

One embodiment of the method contains a further step for measuring a geometry of a projected or traveled trajectory using a measurement system. The at least one geometric parameter of the traveled trajectory can thus be derived on the basis of the measured geometry. A geometry defining the geometric parameter can be measured in this manner. The predefined or determined trajectory geometry can be measured as such. Alternatively or additionally, geometric reference points for the trajectory geometry can be measured that are not lying thereon. If the trajectory is curved or circular, the center of the circle and/or tangents to the trajectory can be measured, for example, to determine the trajectory indirectly. The measurement of a geometric parameter can also include incorporating the trajectory geometry in a superordinate coordinate system, or adding it thereto. A tachymeter or theodolite can be used for the measurement. The superordinate coordinate system can be a system with superordinated precision. The superordinate system can be an official coordinate system, a factory coordinate system, a harbor coordinate system, or a construction site coordinate system, for example. A relationship to a superordinate system can therefore be obtained by embedding the trajectory in such a system.

In another embodiment of the method, the trajectory has at least one curved segment. The geometric parameter can contain at least one geometric curve parameter for a curved segment of the trajectory. The geometric curve parameter can be a curvature or a reciprocal curvature radius of the trajectory. Curvatures that can be derived from the positions acquired with the position detection systems in the respective coordinate systems can then be compared with the geometric curve parameters as reference values. Differences between the positions acquired with the position detection systems can then be compensated for, or adjusted to the geometric curve parameter.

In another embodiment of the method, the trajectory has at least one segment of a conical section curve. The trajectory can contain a line segment, an arc, a circle, an ellipse, and/or an oval. The trajectory can also contain a parabola and/or a hyperbola. In addition to such a conical section curve, the trajectory can also contain a Euler's spiral or a sine wave as a trajectory element.

In another embodiment of the method, the navigable trajectory contains a segment with an arc. An arced trajectory segment or a curve with a constant curvature can be traveled with a constant predefined or controlled steering angle. A respective arc can be derived in the respective coordinate system from at least three positions, which can be acquired with the position detection system, and compared with the arced trajectory segment. Alternatively or additionally, a center point and a respective radius can be derived for the arc in the respective coordinate system, and compared with the arced trajectory segment. The curvature of the arc can therefore be used as a correction value for correcting a position acquired with one of the position detection systems.

In another embodiment of the method, the navigable trajectory contains a segment that forms a line segment. A straight trajectory segment or a curve-less travel along a line segment can be obtained with a predefined or controlled steering angle along a line segment. A respective straight segment can be derived in the respective coordinate system from at least two positions that can be determined with the position detection systems, and compared with the straight segment of the trajectory. The two positions can define a starting position and an end position of the trajectory. The linearity of the straight segment than thus be used as a correction value.

The present disclosure also relates to a control unit that is configured to execute the method according to any of its embodiments.

The present disclosure also relates to a transformation system for providing transformation parameters for a transformation of a position of a vehicle between a first coordinate system and a second coordinate system. The transformation system can be located on the vehicle. The transformation system can also communicate with the vehicle and not be located on the vehicle.

The transformation system has a provider for providing a geometric parameter relating to a navigable trajectory for the vehicle. The provider can be a parameter defining unit for defining a geometric parameter in relation to a projected trajectory. Alternatively or additionally, the provider can have a parameter determining unit for determining a traveled trajectory from geometric information. The provider can be configured to define and/or determine at least one of the geometric parameters described herein.

The transformation system also contains a first position detection system for acquiring positions of the vehicle along the navigable trajectory in the first coordinate system. The transformation system also contains a second position detection system for acquiring positions of the vehicle along the navigable trajectory in the second coordinate system. The first and/or second position detection system can be partially or substantially entirely located on the vehicle. The first and/or second position detection system can alternatively or additionally also be located outside the vehicle, and detect respective positions of the vehicle.

The transformation system also contains a computer for deriving transformation parameters between the first coordinate system and the second coordinate system on the basis of the positions of the vehicle that can be acquired in the first coordinate system and the second coordinate system, and the geometric parameter that can be provided with respect to the trajectory.

In one embodiment of the transformation system, the provider is a route the vehicle can travel along the trajectory. The route can be a road in a harbor or a construction site on which the vehicle can travel with a predefined trajectory geometry. The at least one geometric parameter can be predefined as described above. In one embodiment of the transformation system, the provider is a visualizer of a trajectory traveled by the vehicle. The visualizer can be attached permanently or temporarily to the vehicle in order to visualize a trajectory geometry that can be traveled. The at least one geometric parameter can be determined as described above.

The present disclosure also relates to a vehicle containing the control unit or the transformation system. The vehicle can be an autonomous vehicle.

Figure 1:
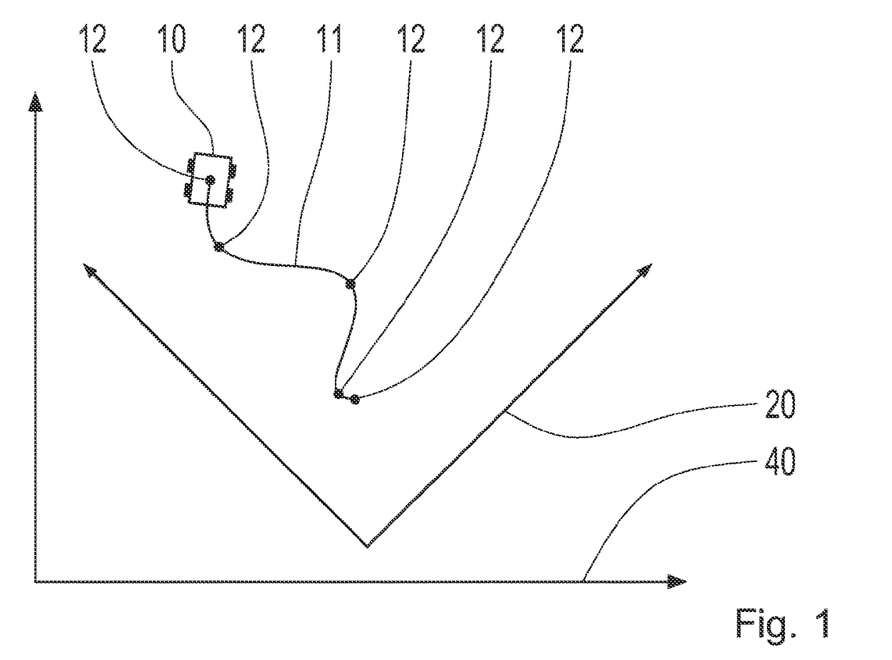
FIG. 1 shows a schematic illustration of a vehicle and a trajectory from above, illustrating the method and the transformation system for providing transformation parameters.

A vehicle 10 is shown in FIG. 1, travelling along a curved trajectory 11. The vehicle 10 moves in a first coordinate system 20 and a second coordinate system 40. The curved trajectory 11 curves toward the right and toward the left in alternating segments.

When travelling along the trajectory 11, a first position detection system (not shown) on the vehicle 10 acquires vehicle positions 12 in the first coordinate system 20, shown by way of example. A second position detection system (not shown) on the vehicle 10 acquires the vehicle positions 12 in the second coordinate system 40. An offset between the position detection systems is known in a vehicle coordinate system, to detect corresponding positions 12. The vehicle positions 12 shown by way of example relate to the maximum curvatures along the trajectory 11, i.e. points on the trajectory with a maximum curvature in a respective trajectory segment curving toward the left or right.

An acquired geometric course of the trajectory 11 is derived from the respective vehicle positions 12 acquired in the two coordinate systems 20, 40 and compared with the trajectory 11 actually traveled by the vehicle 10. A geometric course is derived in each case through interpolation, based on the acquired vehicle positions 12. The actual trajectory 11 is derived for this from a series of steering angles detected in the vehicle 10.

The geometric parameter of the trajectory 11 is the series of curves. Transformation parameters between the first coordinate system 20 and the second coordinate system 40 are then derived from superimposing the vehicle positions 12 acquired in the two coordinate systems, or the geometric series of curves in the trajectory 11 derived in the coordinate systems 20, 40 are derived with the actual series of curves in the trajectory 11.

Figure 2:
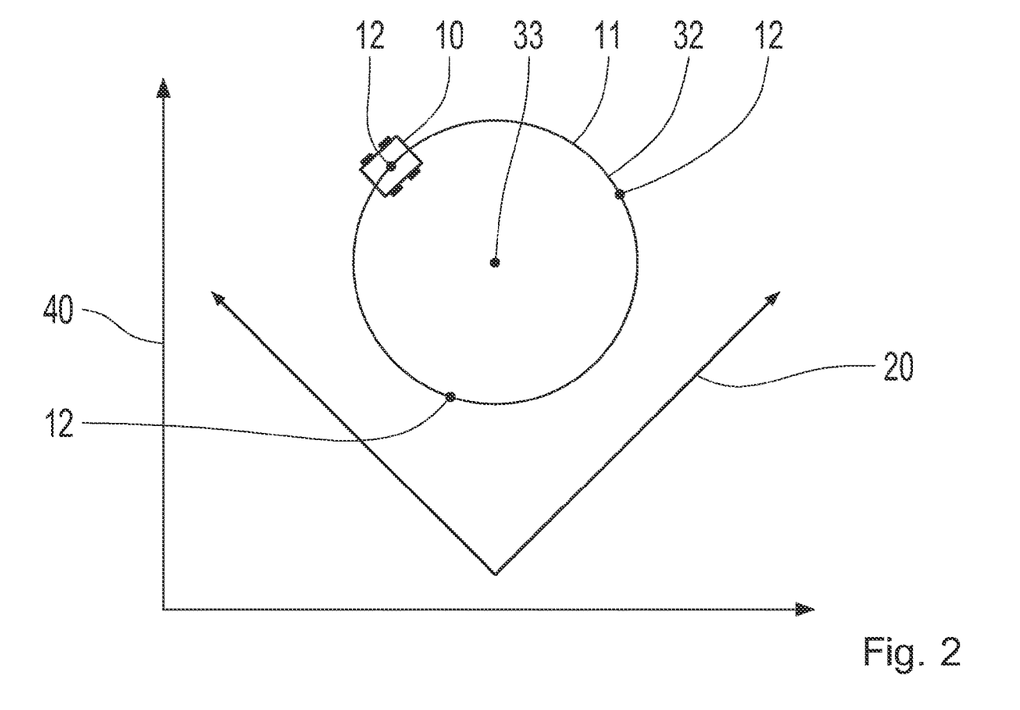
FIG. 2 shows a schematic illustration of the vehicle and another trajectory from above, further illustrating the method and the transformation system for providing transformation parameters.

The vehicle 10 shown in FIG. 2 travels in a circle. The vehicle moves in the first coordinate system 20 and in the second coordinate system 40. The vehicle positions 12 acquired in the two coordinate systems 20, 40 by the two position detection systems while traveling along the trajectory 11 relate to points on a circle along the trajectory 11, i.e. points at the same distance to the center 33 of the circle 32 that is traveled.

The geometric parameter of the trajectory 11 is the circle. A circular course of the trajectory 11 acquired by the position detection systems from the respective vehicle positions 12 acquired in the two coordinate systems 20, 40 is compared with the circular trajectory 11 actually traveled by the vehicle 10. The actual trajectory 11 is predefined or determined. The actual trajectory is derived for this from a series of steering angles detected in the vehicle 10, obtained with a maximum steering angle.

Figure 3:
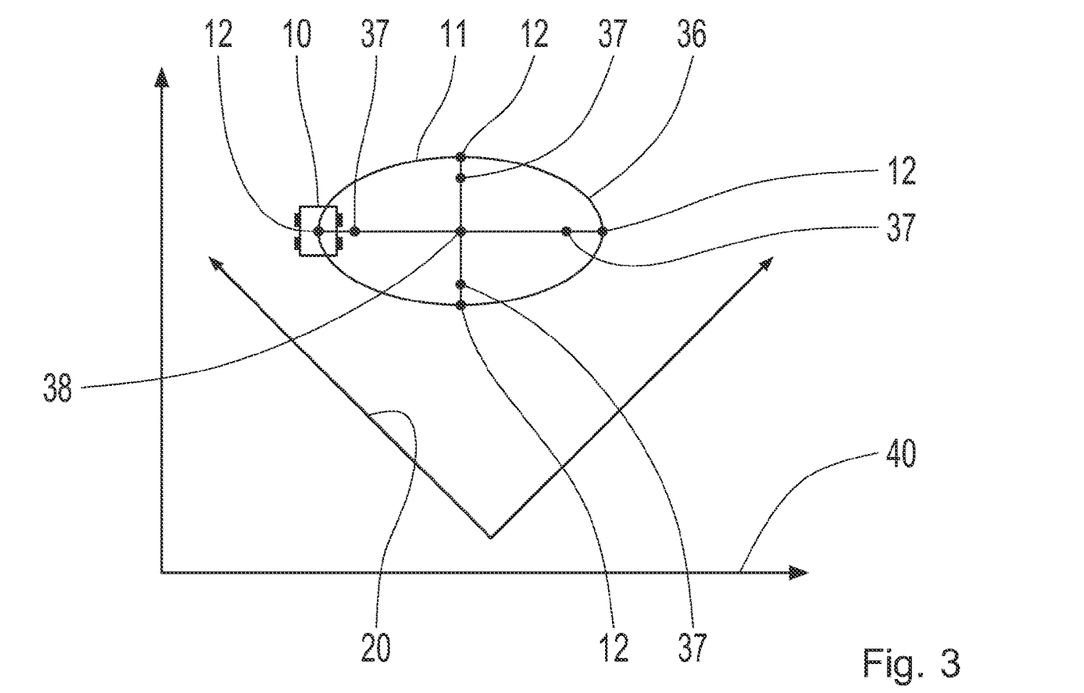
FIG. 3 shows a schematic illustration of the vehicle and another trajectory from above, further illustrating the method and the transformation system for providing transformation parameters.

FIG. 3 shows the vehicle 10 traveling along an ellipse. The vehicle 10 travels in the first coordinate system 20 and in the second coordinate system 40. The vehicle positions 12 acquired in the two coordinate systems 20, 40 by the two position detection systems while traveling along the trajectory 11 relate to points on the ellipse along the trajectory 11, i.e. to points on the trajectory defined in relation to a center 38 of the ellipse 36 and focal points 37 of the ellipse 36. The vehicle positions 12 that are shown relate to a maximum curvature and minimum curvature along the trajectory 11, i.e. points on the trajectory with a maximum and minimum curvature.

The geometric parameter of the trajectory 11 is the ellipse. An elliptical course of the trajectory 11 acquired by the position detection systems from the vehicle positions 12 acquired in the two coordinate systems 20, 40 is compared with the actual elliptical trajectory 11 traveled by the vehicle 10. The actual trajectory 11 is predefined or determined. The actual trajectory 11 is derived for this from a known route (not shown), which describes the elliptical trajectory.

Figure 4:
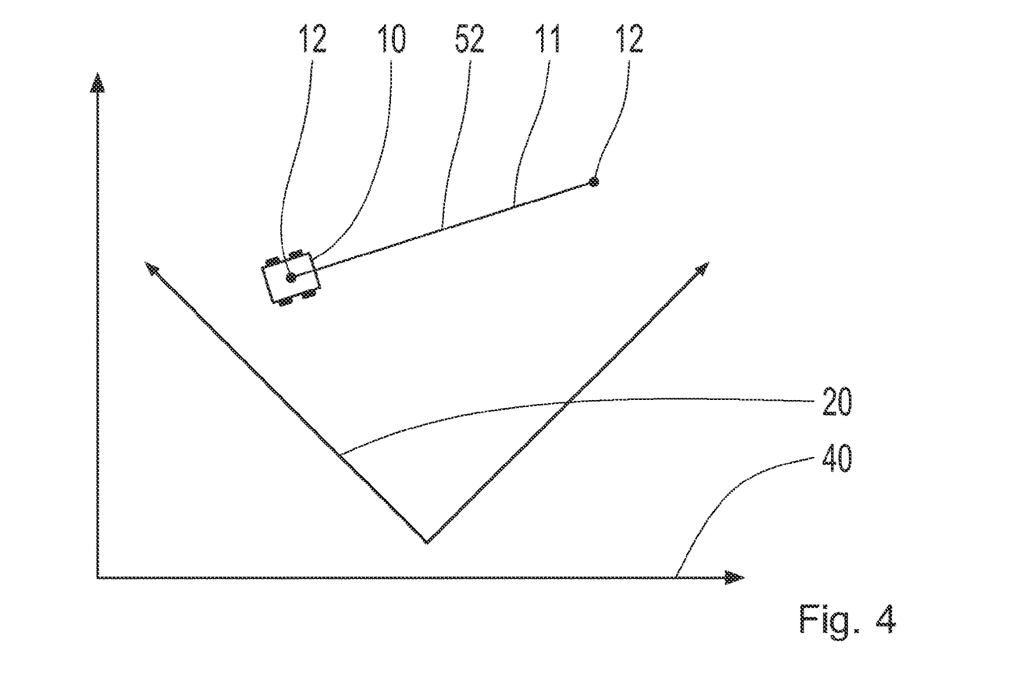
FIG. 4 shows a schematic illustration of the vehicle and another trajectory from above, further illustrating the method and the transformation system for providing transformation parameters.

FIG. 4 shows the vehicle 10 traveling along a line segment 52. The vehicle 10 moves in the first coordinate system 20 and in the second coordinate system 40. The vehicle positions 12 acquired in the two coordinate systems 20, 40 by the position detection systems while traveling along the trajectory 11 relate to a starting point and an end point of the line segment 52.

The geometric parameter of the trajectory 11 is the straight line. A straight geometric course of the trajectory acquired by the position detection systems from the vehicle positions 12 acquired in the two coordinate systems 20, 40 is compared with the actual straight trajectory 11 traveled by the vehicle 10. The actual trajectory 11 is predefined or determined. The actual trajectory 11 is derived for this from a known route (not shown), which describes the straight trajectory.

Figure 5:
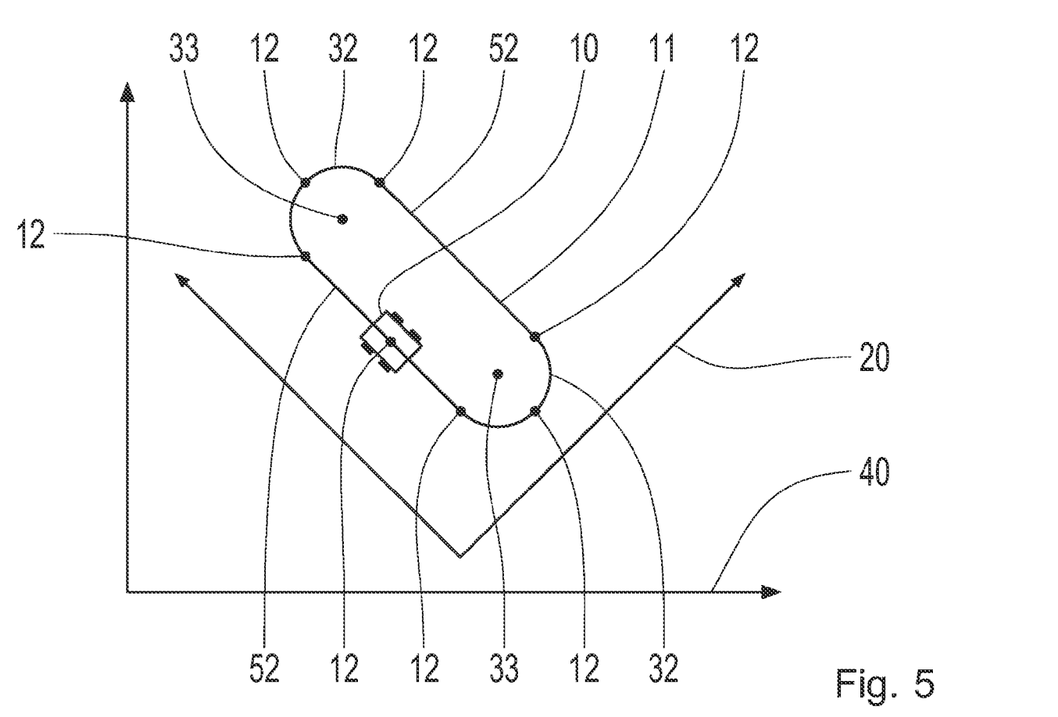
FIG. 5 shows a schematic illustration of the vehicle and another trajectory from above, further illustrating the method and the transformation system for providing transformation parameters.

FIG. 5 shows the vehicle 10 traveling along a trajectory 11 containing segments formed by arcs 32 and line segments 52. The vehicle moves in the first coordinate system 20 and the second coordinate system 40. The vehicle positions 12 acquired in the two coordinate systems 20, 40 by the two position detection systems relate to transition points between the arcs 32 and the line segments 52, and a respective point on the arcs 32.

Geometric parameters of the trajectory 11 are the respective straight lines and the arcs of the individual segments of the trajectory. A geometric course of the trajectory 11 acquired by the position detection systems from the respective vehicle positions 12 acquired in the two coordinate systems 20, 40 is compared with the actual trajectory 11 traveled by the vehicle 10. The actual trajectory 11 is predefined or determined. The actual trajectory 11 is derived for this from a known route (not shown), which describes the straight line trajectory.

Figure 6:
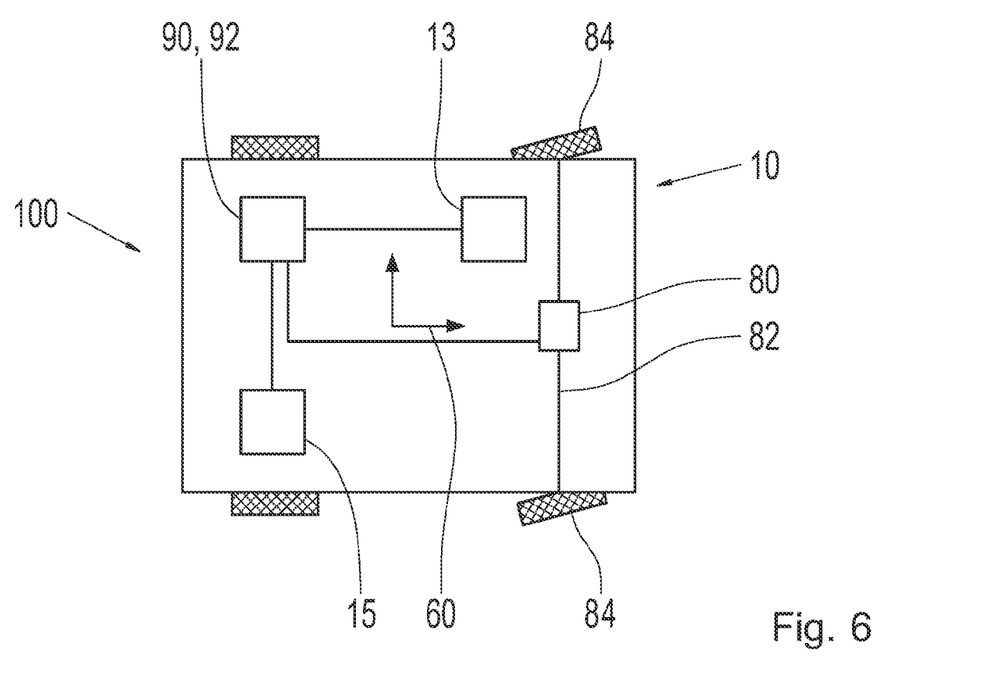
FIG. 6 shows an embodiment of the vehicle in FIGS. 1 to 5.

The vehicle is shown schematically in FIG. 6. The vehicle 10 contains a transformation system 100. The transformation system 100 contains a provider 80, which is a steering system 82 of the vehicle 10 in one embodiment. The steering system 82 aligns the wheels 84 of the vehicle 10, and provides a current steering angle of the vehicle 10. The vehicle 10 can travel along the illustrated trajectories 11 by aligning and steering the wheels 84 in this manner. The curvature of the actual traveled trajectory 11, and therefore the trajectory itself, can be derived from the current steering angle.

The transformation system 100 also contains the first position detection system 13 and the second position detection system 15, which acquire the vehicle positions 12 and the course of the trajectory 11 in the respective coordinate systems 20, 40. The position detection systems 13, 15 are positioned in a vehicle coordinate system 60 on the vehicle 10. The vehicle positions 12 and the trajectory 11 relate to the origin of the vehicle coordinate system 60. A computer 92 is connected to the two position detection systems 13, 15 and the steering system 82, or the provider 80, in order to derive the transformation parameter, as described above.

A control unit 90 comprises the computer for executing the steps of the method for deriving the transformation parameter. The control unit 90 is also connected to the two position detection systems 13, 15 and the steering system 82, or the provider 80.

Figure 7:
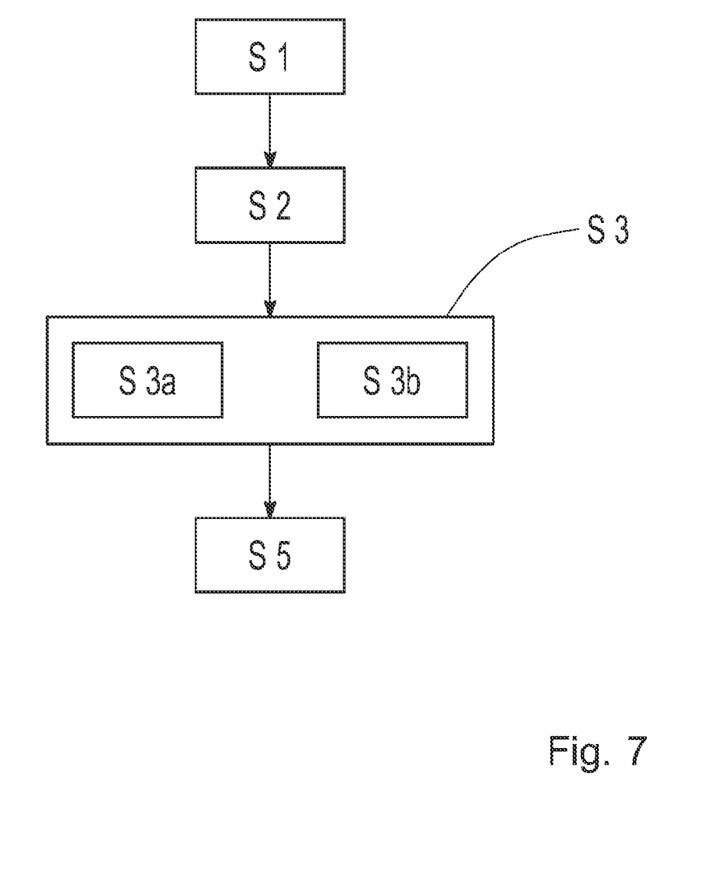
FIG. 7 shows a flow chart of the method steps for executing an embodiment of the method.

The steps S1, S2, S3, S5 of the method for providing the transformation parameter for a transformation of a vehicle position 12 between the coordinate systems 20, 40 in a temporal sequence are shown in one embodiment in FIG. 7.

One of the trajectories 11 described in FIGS. 1 to 5 is defined in the first step S1. The trajectories 11 described in FIGS. 1 to 5 can also be repeated or combined. The trajectory 11 defined in the first step S1 is traveled in the second step S2. The vehicle positions 12 shown by way of example in FIGS. 1 to 5, and thus the geometric courses of the trajectory 11 are acquired in the third step S3 while traveling along the trajectory. The vehicle positions 12 and the geometric course of the trajectory 11 are acquired with the first position detection system 13 in the first coordinate system 20 in a first position detection in a first sub-step S3a. The vehicle positions 12 and the geometric course of the trajectory are acquired in a second sub-step S3b with the second position detection system 15 in the second coordinate system 40, in a second position detection. The transformation parameter is derived therefrom in the fourth step S5.

Figure 8:
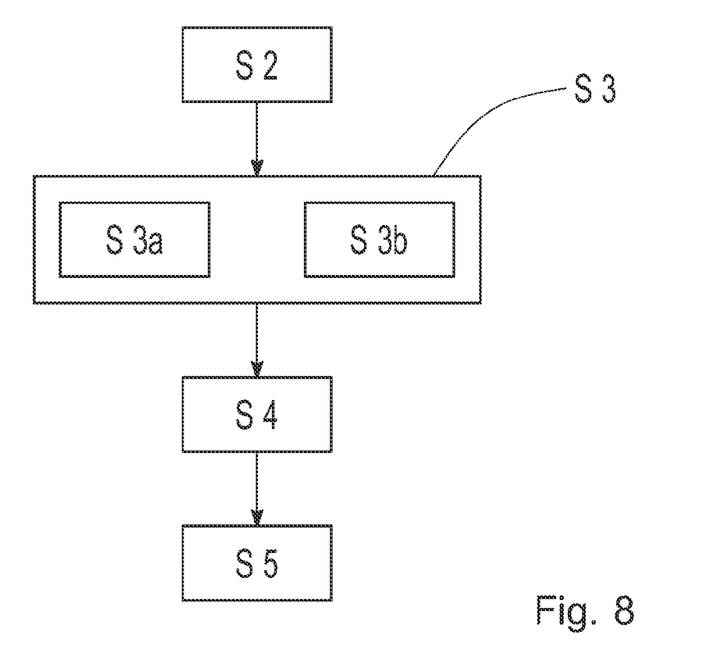
FIG. 8 shows a flow chart of the method steps for executing another embodiment of the method.

Steps S2, S3, S4, S5 of the method for providing the transformation parameter for a transformation of a vehicle position 12 between the coordinate systems 20, 40 in a temporal sequence are shown in another embodiment in FIG. 8.

One of the trajectories 11 described in FIGS. 1 to 5 is traveled in a first step S2. The vehicle positions 12 shown by way of example in FIGS. 1 to 5, and thus the geometric trajectory 11 when traveling the trajectory 11, are acquired in a second step S3 in sub-steps S3a, S3b. The actual trajectory 11 traveled in the first step S2 is determined in a third step S4, as described above. The transformation parameter is derived therefrom in the fourth step S5, as described above.

REFERENCE SYMBOLS 10 vehicle
11 trajectory
12 vehicle position
13 first position detection system
15 second position detection system
20 first coordinate system
32 circle
33 center of the circle
36 ellipse
37 focal points of the ellipse
38 center of the ellipse
40 second coordinate system
52 line segment
80 provider
82 steering system
90 control unit
100 transformation system
S1 description of trajectory
S2 traveling along the trajectory
S3 position acquisition
S3a first position detection
S3b second position detection
S4 determination of the trajectory
S5 derivation of the transformation parameter

The invention claimed is:

1. A method for determining transformation parameters for a transformation of a position of a vehicle between a first coordinate system and a second coordinate system, comprising:
   traveling along a trajectory with the vehicle;
   acquiring positions of the vehicle in the first coordinate system with a first position detection system while traveling along the trajectory;
   acquiring positions of the vehicle in the second coordinate system with a second position detection system that is different than the first position detection system while traveling along the trajectory;
   receiving, by a computing device, the positions of the vehicle in the first coordinate system from the first position detection system and the positions of the vehicle in the second coordinate system from the second position detection system; and
   deriving, by the computing device, transformation parameters between the first coordinate system and the second coordinate system based on the positions of the vehicle acquired in the first coordinate system received from the first position detection system and the positions of the vehicle acquired in the second coordinate system received from the second position detection system and also based on at least one first geometric parameter of the trajectory travelled by the vehicle, wherein deriving the transformation parameters comprises:
   determining at least one second geometric parameter of the trajectory based on positions of the vehicle acquired in the first coordinate system and the second coordinate system while traveling along the trajectory; and
   comparing the at least one second geometric parameter with the at least one first geometric parameter of the trajectory.

2. The method according to claim 1, wherein the trajectory is a predetermined trajectory including the at least one first geometric parameter.

3. The method according to claim 2, wherein the predetermined trajectory is defined on the basis of a route, wherein traveling along the trajectory includes traveling along the route, and wherein deriving the transformation parameters is carried out on the basis of the at least one first geometric parameter of the trajectory defined by the route.

4. The method according to claim 1, wherein the predetermined trajectory is predefined on the basis of a vehicle control parameter, wherein the vehicle is controlled while traveling along the trajectory taking the vehicle control parameter into account, and wherein deriving the transformation parameters is carried out on the basis of the at least one first geometric parameter of the trajectory defined by the vehicle control parameter.

5. The method according to claim 1, further comprising: determining the trajectory traveled by the vehicle.

6. The method according to claim 1, further comprising: visualizing a traveled trajectory as the trajectory, wherein the at least one first geometric parameter of the traveled trajectory is derived from the visualized trajectory.

7. The method according to claim 1, further comprising the step:
acquiring a traveled trajectory using measurement technology, wherein the at least one geometric parameter of the traveled trajectory is derived from the trajectory acquired using measurement technology.

8. The method according to claim 1, wherein a vehicle control parameter is acquired while the vehicle travels along the trajectory, wherein the vehicle is controlled while traveling along the trajectory via the vehicle control parameter, and wherein the at least one first geometric parameter of the traveled trajectory is derived from the acquired vehicle control parameter.

9. The method according to claim 1, comprising:
measuring a geometry of a projected or traveled trajectory as the trajectory with a measurement system, wherein the at least one first geometric parameter of the trajectory is derived on the basis of the measured geometry.

10. The method according to claim 1, wherein the at least one first geometric parameter contains at least one curved segment of the trajectory.

11. The method according to claim 1, wherein the at least one first geometric parameter contains at least one segment of a conical section curve of the trajectory.

12. A transformation system for determining transformation parameters for a transformation of a position of a vehicle between a first coordinate system and a second coordinate system, comprising:
a vehicle component that supplies a first geometric parameter relating to a trajectory navigated by a vehicle,
a first position detection system for acquiring positions of the vehicle along the navigable trajectory in the first coordinate system,
a second position detection system for acquiring positions of the vehicle along the navigable trajectory in the second coordinate system, wherein the second position detection system is different than the first position detection system,
and
a computer for receiving the positions of the vehicle in the first coordinate system from the first position detection system, for receiving the positions of the vehicle in the second coordinate system from the second position detection system, and for deriving transformation parameters between the first coordinate system and the second coordinate system based on the received positions of the vehicle acquired in the first coordinate system and the second coordinate system, and also based on the first geometric parameter provided with respect to the trajectory, wherein deriving the transformation parameters comprises:
determining at least one second geometric parameter of the trajectory based on positions of the vehicle acquired in the first coordinate system and the second coordinate system while traveling along the trajectory; and
comparing the at least one second geometric parameter with the at least one first geometric parameter of the trajectory.

13. A vehicle including the transformation system according to claim 12.

14. The transformation system of claim 12, wherein the vehicle component includes a steering system.

15. A transformation system, comprising:
a steering system that includes a first geometric parameter relating to a trajectory navigated by a vehicle,
a first position detection system for acquiring positions of the vehicle along the trajectory in a first coordinate system,
a second position detection system for acquiring positions of the vehicle along the trajectory in a second coordinate system, wherein the second position detection system is different than the first position detection system, and
a computer for receiving the positions of the vehicle along the trajectory in the first coordinate system from the first position detection system, for receiving the positions of the vehicle along the trajectory in the second coordinate system from the second position detection system, and for deriving transformation parameters between the first coordinate system and the second coordinate system, wherein deriving the transformation parameters comprises:
determining at least one second geometric parameter of the trajectory based on positions of the vehicle acquired in the first coordinate system and the second coordinate system while traveling along the trajectory; and
comparing the at least one second geometric parameter with the at least one first geometric parameter of the trajectory.

16. The transformation system of claim 15, wherein the computer derives the transformation parameters based on the positions of the vehicle relative to the first coordinate system and the second coordinate system.

17. The transformation system of claim 15, wherein the steering system is mechanically coupled to wheels of the vehicle such that it is configured to align the wheels of the vehicle.

* * * * *